United States Patent
Yamada et al.

(10) Patent No.: US 8,495,895 B2
(45) Date of Patent: Jul. 30, 2013

(54) BENT GLASS SHEET SHAPING METHOD

(75) Inventors: Kazuo Yamada, Tokyo (JP); Takahiro Shimomura, Tokyo (JP); Komei Kato, Tokyo (JP); Shinichi Nishimoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 465 days.

(21) Appl. No.: 11/643,126

(22) Filed: Dec. 21, 2006

(65) Prior Publication Data
US 2007/0138824 A1 Jun. 21, 2007

(30) Foreign Application Priority Data
Dec. 21, 2005 (JP) .................... 2005-368051

(51) Int. Cl.
*C03B 23/023* (2006.01)

(52) U.S. Cl.
USPC .............................. 65/106; 65/102

(58) Field of Classification Search
USPC .................. 65/104–106; 359/894; 428/172
See application file for complete search history.

(56) References Cited

U.S. PATENT DOCUMENTS

| | | | | |
|---|---|---|---|---|
| 3,700,542 A | * | 10/1972 | Davis | 428/174 |
| 4,001,476 A | * | 1/1977 | Maltman et al. | 428/209 |
| 4,093,438 A | | 6/1978 | Currie | |
| 4,108,624 A | * | 8/1978 | Claassen | 65/273 |
| 4,753,669 A | * | 6/1988 | Reese | 65/273 |
| 5,296,014 A | | 3/1994 | Lesage et al. | |
| 5,441,551 A | * | 8/1995 | Ollfisch et al. | 65/162 |
| 5,992,178 A | * | 11/1999 | Kuster | 65/24 |
| 6,276,173 B1 | | 8/2001 | Vanhuysse et al. | |

FOREIGN PATENT DOCUMENTS

| | | |
|---|---|---|
| EP | 0 477 785 A2 | 4/1992 |
| JP | 61 261226 | 11/1986 |
| JP | 2004-250257 | 9/2004 |
| WO | WO 2005/033026 | 4/2005 |

OTHER PUBLICATIONS

Tooley, F.V.: "The Handbook of Glass Manufacture" 1985, Ashle Publishing Co., Inc.

* cited by examiner

*Primary Examiner* — Jodi C Franklin
(74) *Attorney, Agent, or Firm* — Cozen O'Connor

(57) ABSTRACT

A bent glass sheet shaping method which is capable of reducing occurrence of visibility distortions and a bent glass sheet with reduced visibility distortions. A glass sheet is heated to a shapeable temperature, a cover material is mounted onto a press die such that a direction of waves in the cover material is diagonal to a direction of distortions in the glass sheet, and the heated glass sheet with the press die is pressed.

4 Claims, 8 Drawing Sheets

BENT GLASS SHEET SHAPING METHOD

BACKGROUND OF THE INVENTION

1. Field of the Invention

The present invention relates to a bent glass sheet shaping method and a bent glass sheet.

2. Description of the Related Art

As a method of bending-shaping a window glass, etc. of a vehicle, a bending-shaping method by press bending has been known.

The bending-shaping method by the press bending includes a method of curve shaping a glass sheet heated to a softening point by pressing the glass sheet with a press die having a curved surface to thereby curve the sheet, and a method of curving a softened glass sheet by sucking the glass sheet against a curved surface of a press die via a plurality of through holes provided in the press die with a vacuum device. A heat-resistant cover material is mounted onto the curved surface of the press die for preventing the softened glass sheet from being welded to the curved surface (for example, see Japanese Laid-open Patent Publication (Kokai) No. 2004-250257).

On the other hand, a starting material glass sheet to be bending-shaped is produced by a float process (for example, see U.S. Pat. No. 3,700,542). The float process is to form a highly smooth glass sheet by pouring a molten glass onto molten tin.

However, the glass sheet formed by the float process has unevenness in component in a flowing direction of the molten glass, which may cause the glass sheet to be distorted in the flowing direction of the glass sheet.

In the bending-shaping method by the press bending, the cover material mounted onto the press die is made of knitted fabric of nonadhesive metal fiber, and produced while being wound into a roll. Alternatively, the cover material is knitted into a cylindrical shape, and produced into a flat shape by cutting a side surface of the cylinder. A difference in tension on the fiber or the like during the production causes the produced cover material to be waved substantially in the same direction, thereby providing waves on the cover material. When the glass sheet is pressed via the cover material having waves, the wave portions of the cover material are subjected to uneven heat, thereby causing portions of the glass sheet contacting the wave portions of the cover material to suffer thermal stress, which inevitably causes the produced bent glass sheet to be thermally distorted.

If a direction of the thermal distortions in the glass sheet caused by the waves in the cover material corresponds with a direction of distortions in the starting material glass sheet in the flowing direction of the molten glass, visibility distortions in the bent glass sheet significantly increases.

Using nonwoven fabric such as felt as the cover material can reduce the thermal distortions caused by the waves of the cover material, but the nonwoven fabric is less breathable, thereby disabling the glass sheet to be sucked via the plurality of through holes provided in the press die. Also, the nonwoven fabric is less stretchable, thereby making it difficult to cause the glass sheet to closely contact the press die, etc.

SUMMARY OF THE INVENTION

It is an object of the present invention to provide a bent glass sheet shaping method which is capable of reducing occurrence of visibility distortions and a bent glass sheet with reduced visibility distortions.

To attain the above object, in a first aspect of the present invention, there is provided a bent glass sheet shaping method, comprising a heating step of heating a glass sheet onto a shapeable temperature; a cover material mounting step of mounting a cover material to a press die; and a press bending step of pressing the heated glass sheet with the press die, wherein the cover material mounting step comprises a step of mounting the cover material onto the press die such that a direction of waves in the cover material is diagonal to a direction of distortions in the glass sheet.

With the arrangement of the first aspect of the present invention, the cover material is mounted onto the press die so that the direction of the waves in the cover material is diagonal to the direction of the distortions in the glass sheet, and thus a direction of thermal distortions caused by the waves in the cover material does not correspond with the direction of the distortions in the glass sheet, thereby reducing occurrence of visibility distortions.

Preferably, the glass sheet is produced by a float process, and the direction of the distortions in the glass sheet is identical with a flowing direction of a molten glass in the float process.

Preferably, the method further comprises a vacuum shaping step of sucking the pressed glass sheet via the cover material against the press die.

Preferably, an angle of the direction of the waves in the cover material to the direction of the distortions in the glass sheet is 5 to 45°.

With the arrangement of this preferred embodiment, the angle of the direction of the waves in the cover material to the direction of the distortions in the glass sheet is 5 to 45°, thereby reliably reducing the occurrence of the visibility distortions and allowing the cover material to be mounted to the press die.

Preferably, the cover material is made of knitted fabric of metal fiber.

With the arrangement of this preferred embodiment, the cover material is made of knitted fabric of metal fiber, thereby increasing heat resistance of the cover material.

To attain the above object, in a second aspect of the present invention, there is provided a bent glass sheet used for a vehicle window, that is heat shaped with a press die onto which a cover material with stitches is mounted, wherein a stripe pattern of the bent glass sheet observed by a cross Nicol method is diagonal to a vertical direction of the bent glass sheet when the bent glass sheet is placed in the vehicle window.

With the arrangement of the second aspect of the present invention, the stripe pattern of the bent glass sheet observed by the cross Nicol method is diagonal to the vertical direction of the bent glass sheet when the bent glass sheet is placed in the vehicle window, thereby reducing occurrence of the visibility distortions.

Preferably, the bent glass sheet is placed in the vehicle window such that its vertical direction or lateral direction is identical with a flowing direction of a molten glass when the bent glass sheet is produced.

Preferably, the bent glass sheet comprises a laminated glass.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIGS. 2A and 2B are front views of a glass sheet 20 in FIG. 1, in which FIG. 2A shows the glass sheet 20 not-yet press shaped, and FIG. 2B shows a bent glass sheet 21 after being press shaped;

FIGS. 5A and 5B are views which are useful for explaining visibility distortions in bent glass sheets 21 and 22 shaped by the bent glass sheet shaping device 10 in FIG. 1, in which FIG. 5A shows visibility distortions in the bent glass sheet 21 when the cover material 12 is mounted onto the press die 11 such that a direction of waves 12a in the cover material 12 is diagonal (at an angle of 10°) to a direction of distortions 20a in the glass sheet 20, and FIG. 5B shows visibility distortions in the bent glass sheet 22 when the cover material 12 is mounted onto the press die 11 such that the direction of the waves 12a in the cover material 12 is identical with the direction of the distortions 20a in the glass sheet 20;

FIGS. 6A to 6C are views which are useful for explaining visibility distortions in the bent glass sheets 21 and 22 shaped by the bent glass sheet shaping device 10 in FIG. 1, in which FIG. 6A shows visibility distortions in the bent glass sheet 21 when the cover material 12 is mounted onto the press die 11 so that a direction of the waves 12a in the cover material 12 is diagonal (at the angle of 10°) to a direction of the distortions 20a in the glass sheet 20, FIG. 6B shows visibility distortions in the bent glass sheet 22 when the cover material 12 is mounted onto the press die 11 such that the direction of the waves 12a in the cover material 12 is identical with the direction of the distortions 20a in the glass sheet 20, and FIG. 6C shows visibility distortions in the glass sheet 20 not-yet curve shaped;

FIGS. 7A to 7C are views which are useful for explaining thermal distortions in the bent glass sheets 21 and 22 shaped by the bent glass sheet shaping device 10 in FIG. 1, in which FIG. 7A shows thermal distortions in the bent glass sheet 21 when the cover material 12 is mounted onto the press die 11 so that the direction of waves 12a in the cover material 12 is diagonal (at an angle of 10°) to the direction of the distortions 20a in the glass sheet 20, FIG. 7B shows thermal distortions in the bent glass sheet 22 when the cover material 12 is mounted onto the press die 11 such that the direction of the waves 12a in the cover material 12 is identical with the direction of the distortions 20a in the glass sheet 20, and FIG. 7C shows that no thermal distortions appear in the glass sheet 20 not-yet curve shaped.

DETAILED DESCRIPTION OF THE PREFERRED EMBODIMENTS

Preferred embodiments of the present invention will be described in detail below with reference to the drawings.

Figure 1:
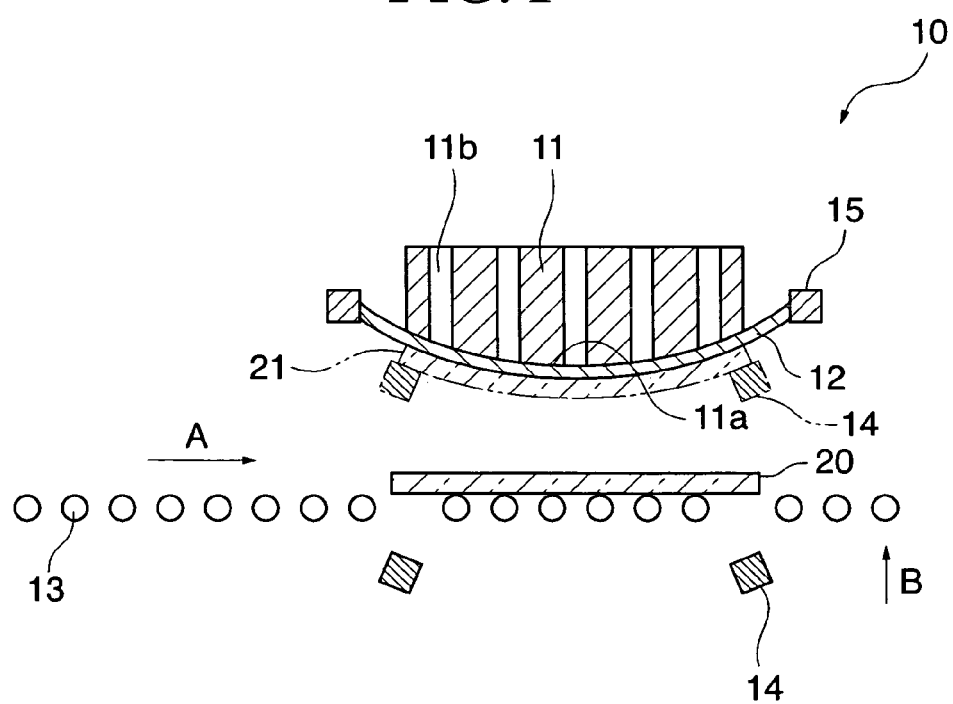
FIG. 1 is a cross sectional view schematically showing the arrangement of a bent glass sheet shaping device for achieving a bent glass sheet shaping method according to an embodiment of the present invention.

FIG. 1 is a cross sectional view schematically showing the arrangement of a bent glass sheet shaping device for achieving a bent glass sheet shaping method according to an embodiment of the present invention.

In FIG. 1, a bent glass sheet shaping device 10 for bending-shaping a windshield of a vehicle includes a press die 11 that presses a glass sheet 20, a heat-resistant cover material 12 mounted onto the press die 11, a cover material mounting frame 15 that holds the cover material 12, a conveying roller 13 that conveys the glass sheet 20, and a support frame 14 that supports a periphery of the glass sheet 20.

The conveying roller 13 conveys the glass sheet 20 heated to a softening point in a furnace, not shown, in a direction of arrow A. The conveyed glass sheet 20 is supported at the periphery by the support frame 14.

The press die 11 is made of firebrick, and has a curved surface 11a for curving the glass sheet 20 by pressing the glass sheet 20. When the glass sheet 20 is conveyed onto the support frame 14 on standby by the conveying roller 13, the support frame 14 drives the glass sheet 20 in the direction of arrow B while supporting the glass sheet 20, and the glass sheet 20 supported at the periphery by the support frame 14 is pressed against the press die 11 via the cover material 12 to thereby be bent.

The press die 11 has a plurality of through holes 11b, which are connected to a vacuum device, not shown, and hence the softened glass sheet 20 is sucked by a suction force of the vacuum device against the cover material 12 along the curved surface 11a of the press die 11. The support frame 14 is driven oppositely to a direction of arrow B, to thereby return to a standby position.

According to the above described step, a bent glass sheet 21 is shaped from the glass sheet 20. The bent glass sheet 21 sucked against the curved surface 11a of the press die 11 via the cover material 12 is supplied to a conveying device, not shown, for conveying the bent glass sheet 20 to the next step.

Figure 2A:
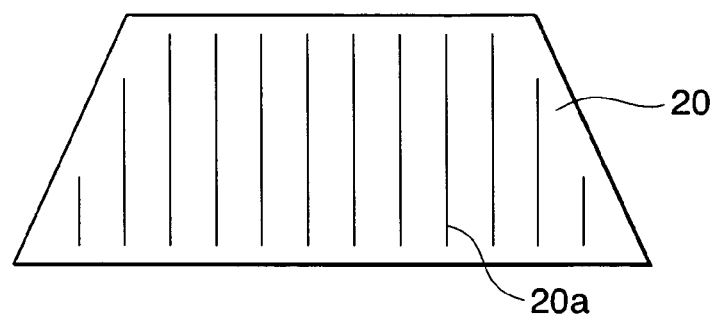

A starting material glass sheet 20 to be bending-shaped by the bent glass sheet shaping device 10 is produced by a float process. The float process is to form a glass sheet by pouring a molten glass onto molten tin in a predetermined direction. The glass sheet 20 formed by the float process has unevenness in component in a flowing direction of the molten glass, which may cause the glass sheet to be distorted in flowing direction of the glass sheet. In FIG. 2A, the glass sheet 20 cut such that the flowing direction of the molten glass is directed in a short side (vertical) direction has distortions 20a in a short side (vertical) direction.

Figure 2B:
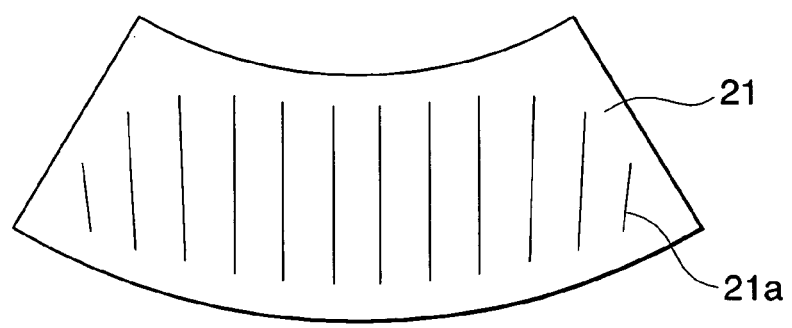

The bent glass sheet 21 bending-shaped from the glass sheet 20 with the distortions 20a by the bent glass sheet shaping device 10 has distortions 20a exist as distortions 21a partially different in direction along a curve of the bent glass sheet 21, as shown in FIG. 2B.

Figure 3A:
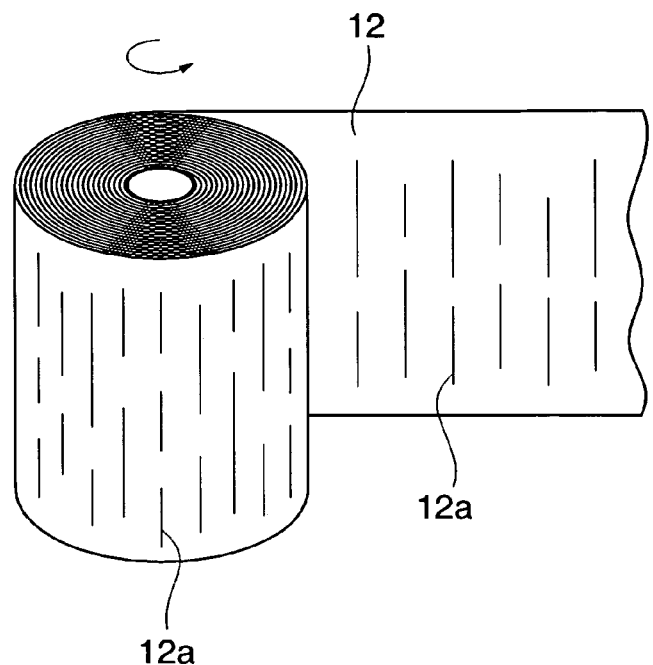
FIGS. 3A, 3B and 3C are views which are useful for explaining a production method of a cover material 12 in FIG. 1.
Figure 3B:
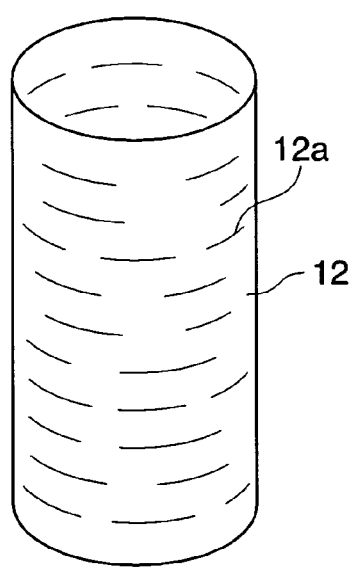
Figure 3C:
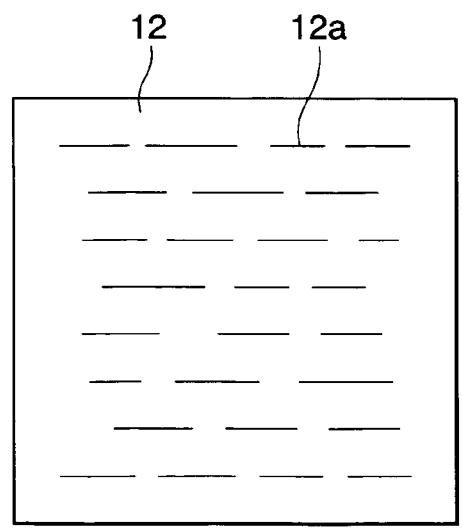

Onto the curved surface 11a of the press die 11 is mounted the heat-resistant cover material 12 for preventing the softened glass sheet 20 from being welded to the curved surface 11a, while being held by the cover material mounting frame 15. The cover material 12 is made of knitted fabric of nonadhesive metal fiber, and produced while being wound into a roll as shown in FIG. 3A. Alternatively, the cover material 12 is knitted into a cylindrical shape as shown in FIG. 3B, and produced into a flat shape by cutting the cylinder in the longitudinal direction, as shown in FIG. 3C.

A difference in tension on the fiber or the like during the production causes the produced cover material 12 to be waved substantially in the same direction, thereby providing waves 12a on the cover material 12. When the glass sheet 20 is pressed via the cover material 12 having the waves 12a, the wave 12a portions of the cover material 12 are subjected to uneven heat, thereby causing portions of the glass sheet 20 contacting the wave 12a portions of the cover material 12 to suffer thermal stress which inevitably causes the produced bent glass sheet 21 to be thermally distorted.

Figure 4:
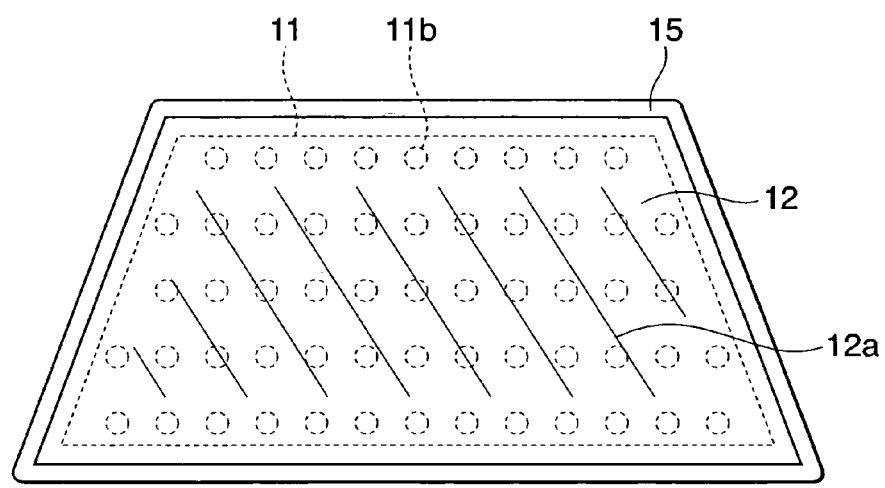
FIG. 4 is a perspective view of a press die 11 and a cover material 12 in FIG. 1 viewed from a side of the cover material 12.

FIG. 4 is a perspective view of the press die 11 and the cover material 12 in FIG. 1 viewed from a side of the cover material 12.

In FIG. 4, the plurality of through holes 11b are formed generally in the press die 11, so that the softened glass sheet 20 can be reliably sucked against the curved surface 11a of the press die 11. The cover material 12 is mounted onto the press die 11 while being held by the cover material mounting frame 15 such that a direction of the waves 12a in the cover material 12 is diagonal to a direction of the distortions 20a in the glass sheet 20. An angle of the direction of the waves 12a in the cover material 12 to the direction of the distortions 20a in the glass sheet 20 is 10°.

Thus, the direction of the distortions 20a in the glass sheet 20 can be displaced from the direction of the thermal distortions in the glass sheet 20 caused by the waves 12a in the cover material 12, thereby reducing occurrence of visibility distortions in the shaped bent glass sheet 21.

As shown in FIG. 2B, the direction of the distortions 20a is displaced as the glass sheet 20 is curved, and thus an angle of the direction of the waves 12a in the cover material 12 to the direction of the distortions 20a in the glass sheet 20 is preferably larger than an angle of the distortions 20a displaced as the glass sheet 20 is curved. From the above, the angle of the direction of the waves 12a in the cover material 12 to the direction of the distortions 20a in the glass sheet 20 is 5 to 45°, preferably 10 to 30°.

Figure 5A:
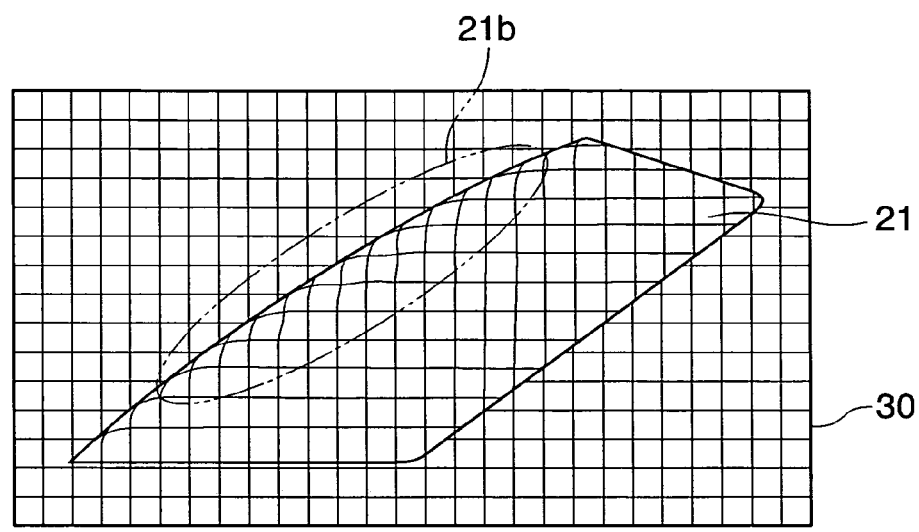
Figure 5B:
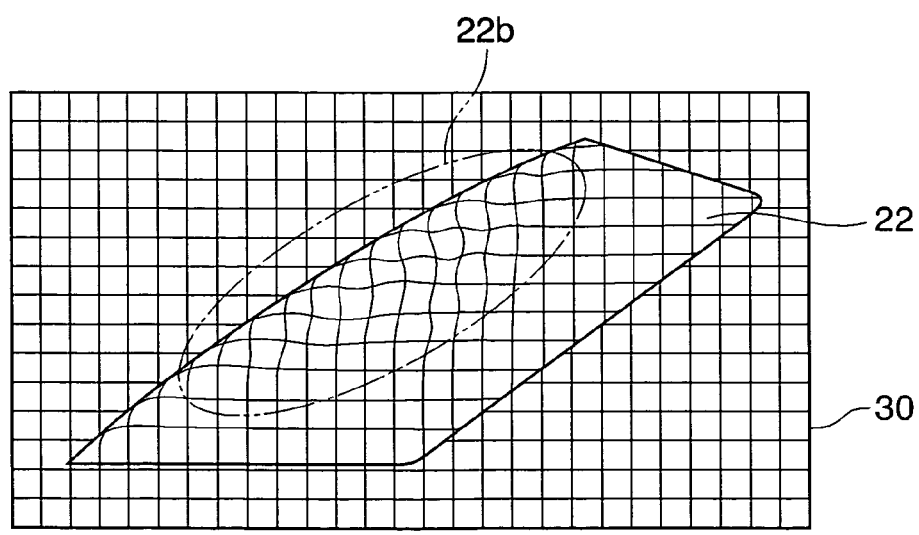

FIGS. 5A and 5B are views which are useful for explaining the visibility distortions in the bent glass sheets 21 and 22 shaped by the bent glass sheet shaping device 10 in FIG. 1.

In FIGS. 5A and 5B, the bent glass sheets 21 and 22 curve shaped by the bent glass sheet shaping device 10 are diagonally placed in front of a grid plate 30 with a grid pattern constituted by vertical lines and lateral lines perpendicular to each other, and the grid pattern of the grid plate 30 is observed through the bent glass sheets 21 and 22. FIG. 5A shows visibility distortions 21b in the bent glass sheet 21 when the cover material 12 is mounted onto the press die 11 such that a direction of the waves 12a in the cover material 12 is diagonal (at an angle of 10°) to the direction of the distortions 20a in the glass sheet 20, and FIG. 5B shows visibility distortions 22b in the bent glass sheet 22 exhibited when the cover material 12 is mounted onto the press die 11 such that the direction of the waves 12a in the cover material 12 is identical with the direction of the distortions 20a in the glass sheet 20.

When the cover material 12 is mounted onto the press die 11 such that the direction of the waves 12a in the cover material 12 is identical with the direction of the distortions 20a in the glass sheet 20, the visibility distortions 22b for lines of the grid pattern of the grid plate 30 observed through the bent glass sheet 22 are large as shown in FIG. 5B.

On the other hand, when the cover material 12 is mounted onto the press die 11 such that the direction of the waves 12a in the cover material 12 is diagonal (at the angle of 10°) to the direction of the distortions 20a in the glass sheet 20, the visibility distortions 21b for lines of the grid pattern of the grid plate 30 observed through the bent glass sheet 21 are small as shown in FIG. 5A.

Figure 6A:
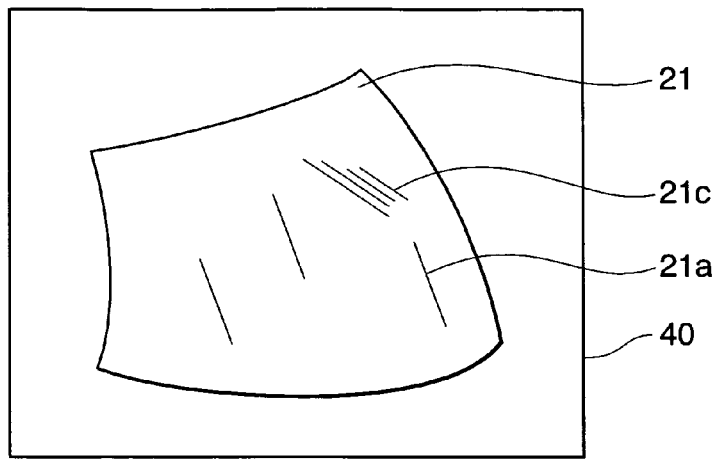
Figure 6B:
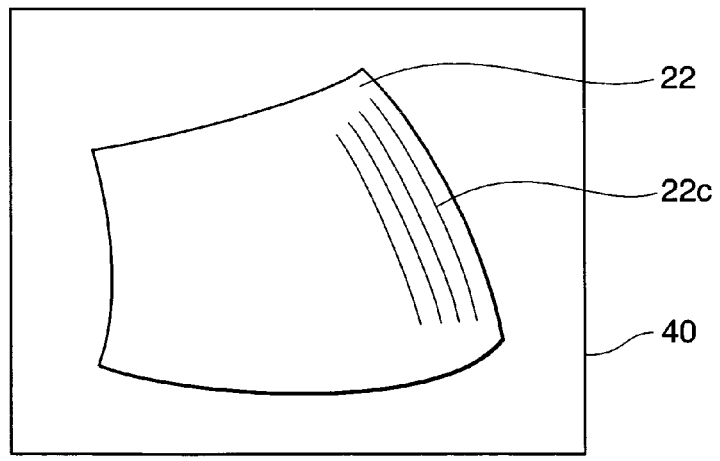
Figure 6C:
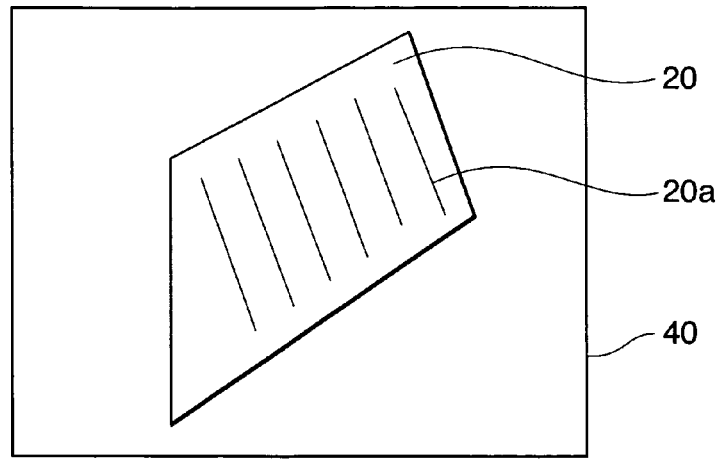

FIGS. 6A to 6C are views which are useful for explaining visibility distortions in the bent glass sheets 21 and 22 shaped by the bent glass sheet shaping device 10 in FIG. 1.

FIGS. 6A to 6C show visibility distortions, respectively, which are observed when the bent glass sheets 21 and 22 curve shaped by the bent glass sheet shaping device 10 and the glass sheet 20 are projected on a screen 40 with light of a projector before being bending-shaped. FIG. 6A shows visibility distortions in the bent glass sheet 21 when the cover material 12 is mounted onto the press die 11 such that the direction of the waves 12a in the cover material 12 is diagonal (at the angle of 10°) to the direction of the distortions 20a in the glass sheet 20, FIG. 6B shows visibility distortions in the bent glass sheet 22 when the cover material 12 is mounted to the press die 11 such that the direction of the waves 12a in the cover material 12 is the same as the direction of the distortions 20a in the glass sheet 20, and FIG. 6C shows visibility distortions in the glass sheet 20 not-yet curve shaped.

As shown in FIG. 6C, the glass sheet 20 not-yet curve shaped has the distortions 20a.

When the cover material 12 is mounted onto the press die 11 such that the direction of the waves 12a in the cover material 12 is identical with the direction of the distortions 20a in the glass sheet 20, the bent glass sheet 22 is subjected to vertical visibility distortions 22c which are larger than distortions in the glass sheet 20 and the bent glass sheet 21, as shown in FIG. 6B.

On the other hand, when the cover material 12 is mounted onto the press die 11 such that the direction of the waves 12a in the cover material 12 is diagonal (at the angle of 10°) to the direction of the distortions 20a in the glass sheet 20, the bent glass sheet 21 is subjected to diagonal visibility distortions 21c, and to partial distortions 21a resulting from the distortions 20a in the glass sheet 20, as shown in FIG. 6A. However, the visibility distortions 21c and the distortions 21a are not identical in direction with each other, and thus are smaller than the visibility distortions 22c in the bent glass sheet 22.

Figure 7A:
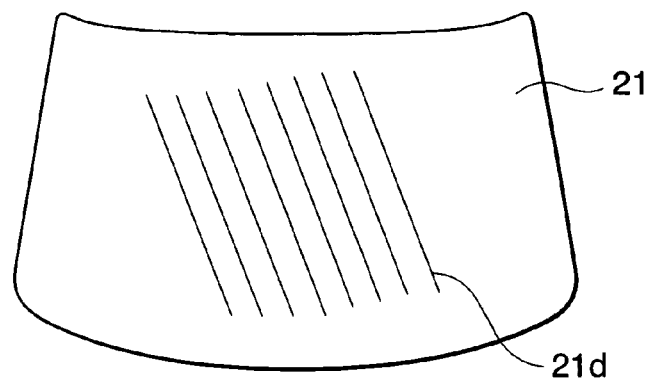
Figure 7B:
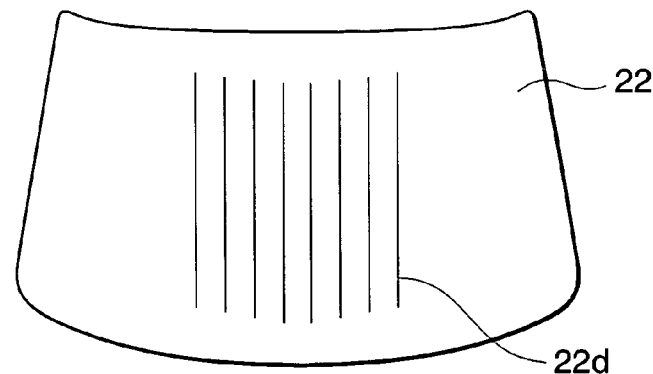
Figure 7C:
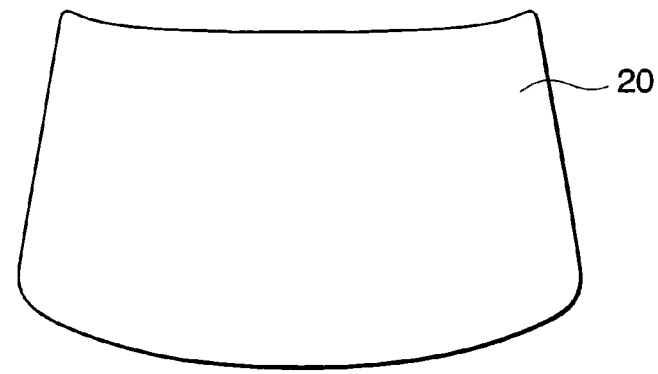

FIGS. 7A to 7C are views which are useful for explaining thermal distortions in the bent glass sheets 21 and 22 bending-shaped by the bent glass sheet shaping device 10 in FIG. 1.

Figure 8:
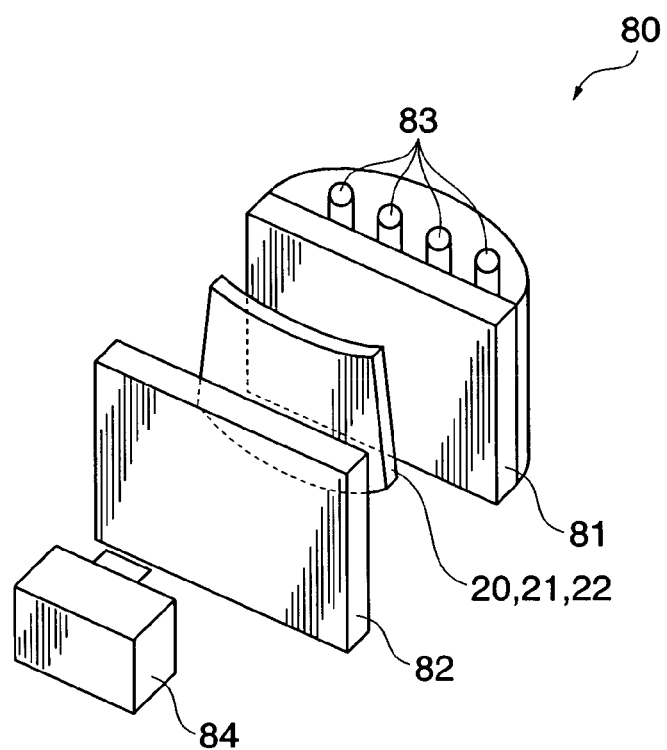
FIG. 8 is a view schematically showing the arrangement of a polarizing plate device which is useful for observing thermal distortions in the bent glass sheets 21 and 22 shaped by the bent glass sheet shaping device 10 in FIG. 1.

FIGS. 7A to 7C show images, respectively, which are obtained by observing the bent glass sheets 21 and 22 curve shaped by the bent glass sheet shaping device 10, and the glass sheet 20 not-yet bending-shaped with a polarizing plate device 80 (a cross Nicol method), as shown in FIG. 8. The polarizing plate device 80 includes polarizing plates 81 and 82 which are perpendicular in polarization direction to each other, and a light source 83. A camera 84 is used for recording the images. With the polarizing plate device 80, portions in the bent glass sheets 21 and 22 under thermal stress caused by the waves 12a in the cover material 12 are observed as thermal distortions, but mild distortions 20a caused by unevenness of component of the starting material glass sheet 20 are not observed. FIG. 7A shows thermal distortions in the bent glass sheet 21 exhibited when the cover material 12 is mounted onto the press die 11 such that the direction of the waves 12a in the cover material 12 is diagonal (at the angle of 10°) to the direction of the distortions 20a in the glass sheet 20, FIG. 7B shows thermal distortions in the bent glass sheet 22 exhibited when the cover material 12 is mounted onto the press die 11 such that the direction of the waves 12a in the cover material 12 is identical with the direction of the distortions 20a in the glass sheet 20, and FIG. 7C shows that no thermal distortions appear in the glass sheet 20 not-yet bending-shaped.

As shown in FIG. 7C, no thermal distortions appear in the glass sheet 20 not-yet bending-shaped.

When the cover material 12 is mounted onto the press die 11 such that the direction of the waves 12a in the cover material 12 is identical with the direction of the distortions 20a in the glass sheet 20, vertical thermal distortions 22d in the bent glass sheet 22 are observed via the polarizing plates 81 and 82 as shown in FIG. 7B. The thermal distortions 22d are observed more clearly than the thermal distortions 21d in FIG. 7A. This may be because the direction of the waves 12a in the cover material 12 corresponds with the direction of the distortions 20a in the glass sheet 20 to thereby increase the thermal distortions 22d occurring in the bent glass sheet 22.

On the other hand, when the cover material 12 is mounted onto the press die 11 such that the direction of the waves 12a in the cover material 12 is diagonal (at the angle of 10°) to the direction of the distortions 20a in the glass sheet 20, the thermal distortions 21d diagonally occurring in the bent glass sheet 21 are observed via the polarizing plates 81 and 82, as shown in FIG. 7A. As described above, the thermal distortions 21d are observed less clearly than the thermal distortions 22d. This may be because the direction of the waves 12a in the cover material 12 is displaced from the direction of the distortions 20a in the glass sheet 20 to thereby reduce the thermal distortions 21d occurring in the bent glass sheet 21.

According to the embodiment, the cover material 12 is mounted onto the press die 11 such that the direction of the waves 12a in the cover material 12 is diagonal (at the angle of 10°) to the direction of the distortions 20a in the glass sheet 20, thereby reducing occurrence of the visibility distortions 21b and 21c and the thermal distortions 21d in the bent glass sheet 21.

In the embodiment, the press die 11 is made of firebrick, but not limited to this, the press die 11 may be made of any refractory material.

In the embodiment, the cover material 12 is made of non-adhesive metal fiber, but not limited to this, the cover material 12 may be made of any heat-resistant material. The cover material 12 is preferably made of stainless steel.

In the embodiment, an example of shaping a single bent glass sheet 21 has been described, but not limited to this, the present invention may be applied to a laminated glass sheet including two bent glass sheets joined together via a resin film. In this case, when the two bent glass sheets are shaped, directions of waves 12a in the cover material 12 may be identical with each other, but are preferably displaced from each other. Thus, when the laminated glass sheet is shaped, thermal distortions in both the bent glass sheets are not enhanced, and hence the laminated glass sheet can be suitably used for a windshield of a vehicle.

In the embodiment, the direction of the distortions 20a in the glass sheet 20 may be vertical, lateral, or diagonal, and the present invention may be applied by displacing the direction of the waves 12a in the cover material 12 from the direction of the distortions 20a in the glass sheet 20.

In the embodiment, an example of applying the present invention to shaping the windshield of the vehicle has been described, but not limited to this, the present invention may be applied to shaping a side glass, a rear glass, or a roof glass.

The above-described embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. A bent glass sheet shaping method, comprising:
   heating a glass sheet to a shapeable temperature, the glass having distortions substantially in a first direction;
   mounting a cover material onto a press die, the cover material having waves substantially in a second direction; and
   pressing the heated glass sheet with the press die,
   wherein said cover material mounting step comprises a step of mounting the cover material onto the press die such that an angle of the second direction of the waves in the cover material to the first direction of distortions in the glass sheet is 5° to 45°.

2. The bent glass sheet shaping method according to claim 1, wherein the glass sheet is produced by a float process, and the first direction of the distortions in the glass sheet is identical with a flowing direction of a molten glass in the float process.

3. The bent glass sheet shaping method according to claim 1, further comprising a vacuum shaping step of sucking the pressed glass sheet via the cover material against the press die.

4. The bent glass sheet shaping method according to claim 1, wherein the cover material is made of knitted fabric of metal fiber.

* * * * *